US006279060B1

United States Patent
Luke et al.

(10) Patent No.: US 6,279,060 B1
(45) Date of Patent: Aug. 21, 2001

(54) UNIVERSAL SERIAL BUS PERIPHERAL BRIDGE SIMULATES A DEVICE DISCONNECT CONDITION TO A HOST WHEN THE DEVICE IS IN A NOT-READY CONDITION TO AVOID WASTING BUS RESOURCES

(75) Inventors: David D. Luke; Eric J. Luttmann; Ronald J. Richter, all of Boise; David C. Gilbert, Meridian, all of ID (US)

(73) Assignee: In-System Design, Inc., Boise, ID (US)

( * ) Notice: Subject to any disclaimer, the term of this patent is extended or adjusted under 35 U.S.C. 154(b) by 0 days.

(21) Appl. No.: 09/205,558

(22) Filed: Dec. 4, 1998

(51) Int. Cl.[7] .................................................. G06F 13/10
(52) U.S. Cl. .............................. 710/64; 710/10; 710/129
(58) Field of Search ................... 710/8, 10, 11, 710/14, 15, 62, 63, 64, 129

(56) References Cited

U.S. PATENT DOCUMENTS

| 5,454,080 | * | 9/1995 | Fasig et al. | 710/103 |
| 5,802,328 | * | 9/1998 | Yoshimura | 710/102 |
| 5,974,486 | * | 10/1999 | Siddappa | 710/53 |
| 6,009,480 | * | 12/1999 | Pleso | 710/8 |

OTHER PUBLICATIONS

Lucent Technologies, "USS–720 Instant USB USB–to–IEEE 1284 Bridge," *Advance Data Sheet*, Rev. 5, Nov. 1997, pp. 1–27.
Peracom web site (www.peracom.com), "USB Overview," Oct. 13, 1998, pp. 1–5.
Peracom web site (www.peracom.com), "USB Serial Converter Specification," Oct. 13, 1998, pp. 1–2.
Peracom web site (www.peracom.com), "USB Quad Hub Specification," Oct. 13, 1998, pp. 1–3.
Intel web site (www.intel.com), "Internet Universal Serial Bus (USB) Components," Oct. 13, 1998, pp. 1–10.
Fairchild Semiconductor web site (www.fairchildsemi.com), "Fairchild P/N 74AC00–Quad 2–Input NAND Gate," Nov. 3, 1998, pp 1–2.
Fairchild Semiconductor web site (www.fairchildsemi.com), "Fairchild P/N 74AC04–Hex Inverter," Nov. 3, 1998, pp. 1–2.
"Chapter 7 Electrical," *Universal Serial Bus Specific 1.00 Final Draft Revision*, p. 111.
*Universal Serial Bus Specification Revision 0.99c*, p. 216.

* cited by examiner

Primary Examiner—Thomas Lee
Assistant Examiner—Thuan Du
(74) *Attorney, Agent, or Firm*—Marger Johnson & McCollom P.C.

(57) ABSTRACT

A Universal Serial Bus (USB) peripheral bridge and method for operation are disclosed. The bridge simulates a device disconnect condition to its upstream USB hub or host, even though it remains connected and powered, when its associated peripheral is not ready to communicate, powered off, or physically disconnected. For an IEEE-1284-1994 peripheral connection, the bridge senses the condition of the PLH peripheral line. If the PLH line is deasserted or floating, the bridge simulates a device disconnect condition by either allowing its upstream hub or host to take the D+ data line low, or taking the line low itself. By not allowing itself to be enumerated on the USB unless its associated peripheral is ready, the bridge avoids confusion at the host and wasted bus resources. At the same time, the bridge may remain physically connected to the host regardless of the state of the peripheral, even if the bridge is powered from the host.

19 Claims, 8 Drawing Sheets

UNIVERSAL SERIAL BUS PERIPHERAL BRIDGE SIMULATES A DEVICE DISCONNECT CONDITION TO A HOST WHEN THE DEVICE IS IN A NOT-READY CONDITION TO AVOID WASTING BUS RESOURCES

FIELD OF THE INVENTION

This invention pertains generally to parallel/serial bus bridges, and more particularly to Universal Serial Bus-to-peripheral generic bridges.

BACKGROUND OF THE INVENTION

The Universal Serial Bus (USB, described in its current release in the *Universal Serial Bus Specification Revision 1.1*) is envisioned as an industry standard for the connection of all peripherals to a personal computer or workstation. USB seeks to replace the various specialized connectors and communication formats utilized with keyboards, mice, joysticks, multimedia inputs and outputs, printers, external disk drives, external CD-ROM drives, modems, parallel ports, serial ports, network connections, and virtually any other type of peripheral, with a single universal cable and connector type and a common communication format. Some of the other features of USB are: a true plug-and-play architecture requiring no user configuration; support for up to 127 peripherals on one bus; flexibility; and low cost.

Figure 1:
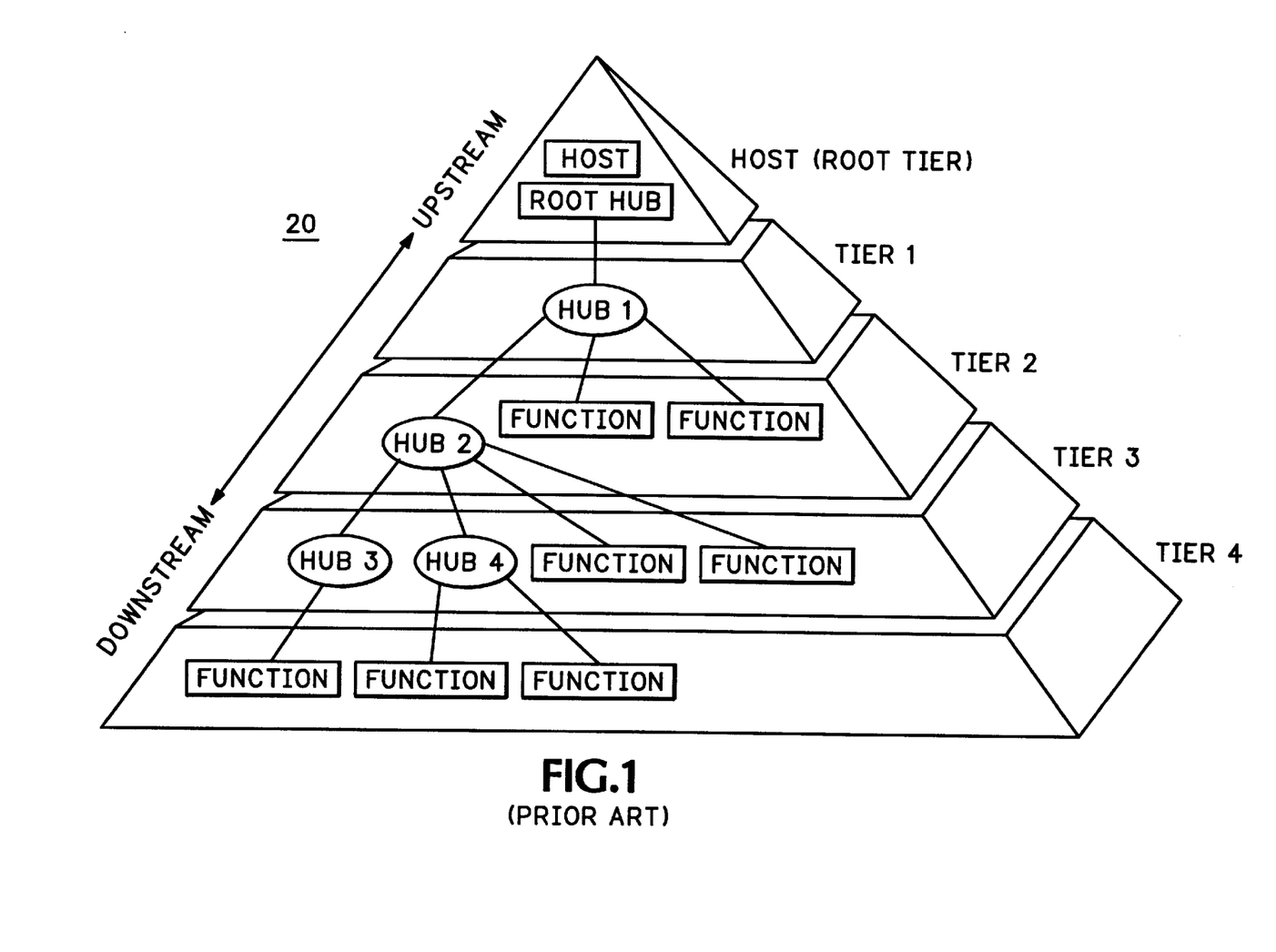
FIG. 1 illustrates a prior art USB physical interconnect topology.

As shown in FIG. 1, a USB physical interconnect has a tiered star topology 20. A bus has a single host, and may have up to five tiers of hubs. A function provides a capability to the host, and may be a data source and/or a data sink. A hub is at the center of each star. A USB cable connects an upstream hub to a downstream USB device, i.e. another hub or a function. Hubs and functions may be self-powered, or bus-powered; a bus-powered device receives power from its upstream hub through the USB cable; a self-powered device receives power from somewhere else.

When a USB device is plugged in to a USB bus, the host detects the new device and "enumerates" it. The enumeration process includes assigning a unique USB address to the device, querying the device to determine what type of device it is, determining the device's communication requirements and whether a bandwidth allocation is available to meet these requirements, and allocating any necessary host software resources such as device drivers.

USB is a complete break from the past—it provides no backwards compatability with previous communication interfaces. But many new users of USB-equipped computers have significant investments in non-USB peripherals such as parallel cable-interfaced printers. Rather than junking these legacy peripherals, many users would prefer to somehow utilize non-USB peripherals with USB-equipped computers. Several vendors have addressed this need by offering USB bridges, which convert USB signals to a legacy format and vice-versa.

If a USB bridge is used to patch a non-USB peripheral into a USB bus, the enumeration process described above is, in effect, divided between the bridge and the peripheral. The host first enumerates the USB bridge itself. This consists of detecting and identifying the bridge device and allocating required resources to support communications between the host and the bridge device via the USB protocol. The host then queries the bridge to determine the type of peripheral attached and allocate resources appropriate to that device.

SUMMARY OF THE INVENTION

The present invention solves a problem present in prior art USB bridges that are not specifically designed for a specific peripheral device. These bridges are either self-powered or bus-powered, and thus they can be enumerated by a host even if their attached peripheral is powered off, not responding, or has even become physically detached from the bridge. In such instances, a generic bridge may be unable to complete enumeration, i.e., by describing a peripheral and its requirements. This situation may leave some hosts in a confused state; in other cases, a half-enumerated connection serves no useful purpose.

The present invention solves this problem by preventing a powered and USB-connected bridge from being recognized as such by the host unless its peripheral is ready to communicate. Instead of relying on the host to recognize that an attached function is a USB bridge to an uncooperative peripheral and respond appropriately, the bridge simply makes itself invisible to the host until such time as it can complete enumeration successfully. Besides avoiding a potentially troublesome host task, this invention creates several additional advantages: bus resources are not wasted on the bridge unless the peripheral is also present; the bridge may remain physically connected to the host regardless of the state of the peripheral, even if the bridge is powered from the host; the bridge need not have any peripheral-specific knowledge; large portions of the bridge itself may be idled when the peripheral is not ready; and the invention adds little complexity or cost to a bridge.

A USB host recognizes when a high-speed downstream device is connected because the downstream device is required to pull D+, one of a differential pair of USB data lines D+ and D−, high when the bus is idle. The present invention allows a connected and powered bridge to avoid recognition by a host by simulating a USB disconnect condition. This may be accomplished in a bridge by disconnecting the pull-up circuitry attached to D+, drastically increasing the resistance of the pull-up circuitry, or decreasing the pull-up voltage. Any of these acts will cause the upstream hub or host to create a low condition—one that looks like a disconnect—on the connected data line. A disconnect may also be simulated by the bridge actively pulling the D+ data line low and leaving it there.

A USB bridge using the present invention simulates a USB disconnect when no peripheral is attached and/or when an attached peripheral has not signaled that it is ready to communicate. In the case of a parallel port-interfaced peripheral adhering to the IEEE-1284-1994 standard, the peripheral asserts a Peripheral Logic High (PLH) signal when it is ready to communicate. The USB bridge of the present invention preferably uses this signal to control simulated disconnects—any PLH condition other than asserted results in a bridge-simulated USB disconnect, while a PLH assertion by the peripheral causes the bridge to show itself to the host as connected.

BRIEF DESCRIPTION OF THE DRAWING

The invention may be best understood by reading the disclosure with reference to the drawing, wherein.

DETAILED DESCRIPTION OF THE PREFERRED EMBODIMENTS

The present invention generally applies to bridges that operate between an upstream USB and a downstream bus of a different type. The specific embodiments described below exemplify the downstream bus with a bus commonly used in printers and the like—a parallel-port IEEE-1284-1994-compatible bus. An IEEE-1284-1994-compatible bus allows communication between a host and a peripheral using at least one data transfer mode as described in *"IEEE Std. 1284-1994 Standard Signaling Method for a Bi-directional Parallel Peripheral Interface for Personal Computers"*. Given the concepts supplied below, one of ordinary skill can readily adapt the embodiments of the invention to bridges between a USB and other bus types.

USB Transceivers

Figure 2:
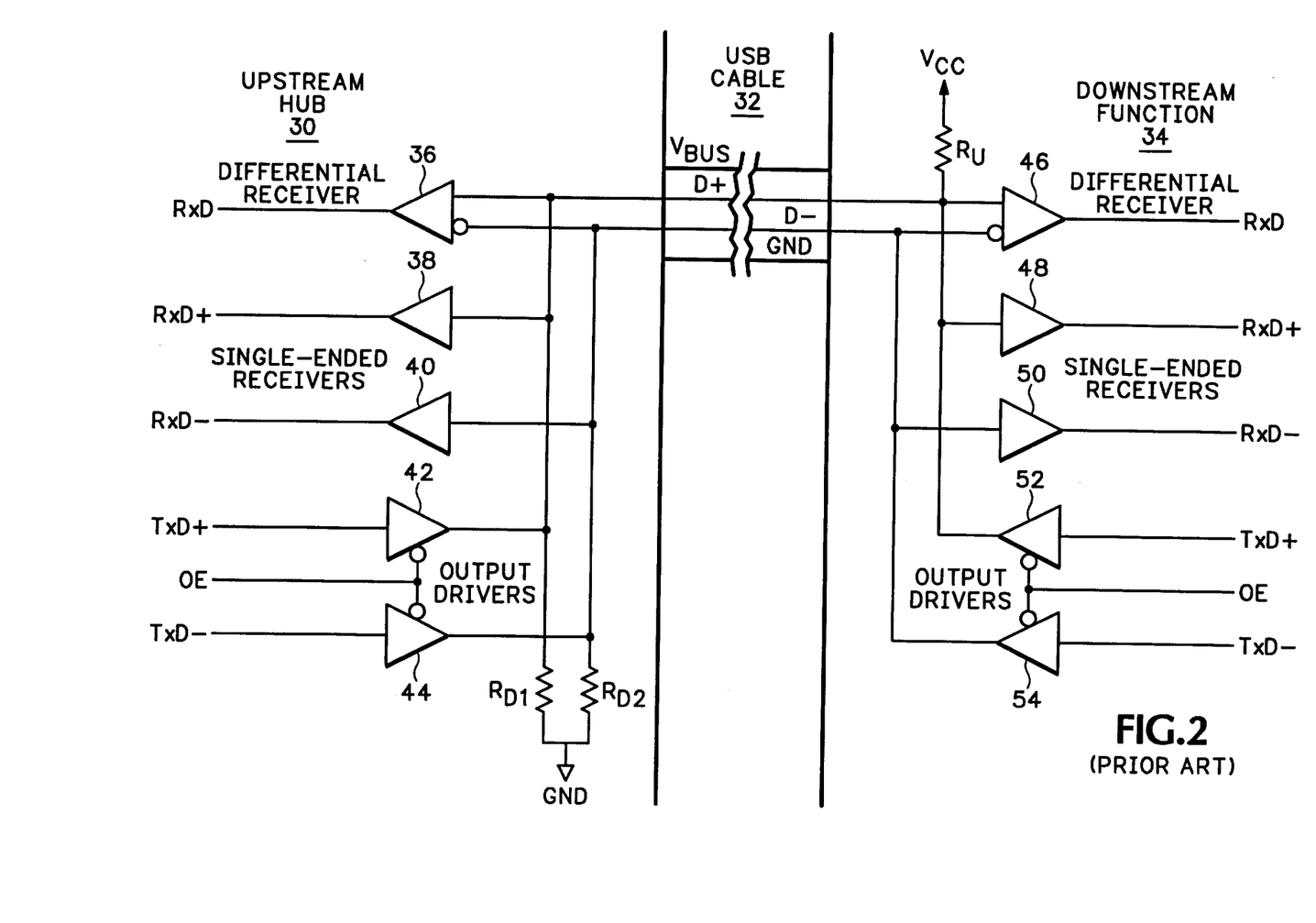
FIG. 2 shows a prior art USB physical connection between a host and a downstream device.

USB-connected devices fall into the general categories of hosts, hubs, and functions. Although two USB devices can be found in a single package (e.g., a host and a root hub, or a hub/function), generally two USB devices are connected by a USB cable. For instance, FIG. 2 shows an upstream hub 30 connected to a downstream function 34 by a USB cable 32. The USB cable houses four conductors: $V_{bus}$, which is maintained nominally at 5 V (the allowable range is 4.0 to 5.25 V, with current limitations) by upstream hub 30, GND, which provides a ground reference to downstream function 34, and a differential pair of signal lines, D+ and D−. In a high-speed USB connection, D+ and D− form a twisted pair within cable 32.

Physical signaling between hub 30 and function 34 occurs over D+ and D−. Hub 30 and function 34 contain signaling transceiver circuitry as shown in FIG. 2. Each USB device connects a differential receiver (36, 46) to D+ and D−, and connects two single-ended receivers, one to D+ (38, 48) and one to D− (40, 50). Although the differential receiver generally detects data transitions, the single-ended receivers are also used to detect the absolute voltage levels on D+ and D−.

Each transceiver also implements a pair of transmit output drivers, one to D+ (42, 52) and one to D− (44, 54). The output drivers are generally tri-state buffers, with a nominal high state of at least 2.8 V, a nominal low state of not more than 0.3 V, and a high-impedance state. An output enable (OE) signal places the drivers in a high-impedance state when they are not transmitting. Each driver must present an impedance between 29 Ω and 44 Ω to the attached data line when driving it, and may use an external series resistor (not shown) to attain this impedance.

Hub 30 and function 34 communicate over D+ and D− in a half-duplex mode, where only one transceiver drives lines D+ and D− at a time. In the USB protocol, communications are divided into one millisecond frames. The USB host (upstream of every other device) transmits first in every frame, and must give permission before a downstream device can drive lines D+ and D−.

If both sets of drivers are in a high-impedance state, an idle condition occurs on the line. Line voltages during an idle condition are determined by the pull-down resistors $R_{D1}$, and $R_{D2}$ in hub 30 and the pull-up resistor $R_U$ in function 34. $R_{D1}$ and $R_{D2}$ have a resistance of 15 kΩ±5%, while $R_U$ has a resistance of 1.5 kΩ±5%. When D− is idle, it will be pulled down to 0 V. Pull-up voltage $V_{CC}$ is specified at 3.3 V±0.3 V, such that during an idle condition D+ should be pulled up to approximately 3.0 V. Note that a low-speed function produces a reversed idle state, by attaching $R_U$ to D− instead of D+.

The idle condition is used by the upstream hub to recognize when a device is physically attached to one of its USB ports. When no device is attached, $R_{D1}$, and $R_{D2}$ pull both D+ and D− low. When a powered device is attached to the port, pull-up resistor $R_U$ pulls one line high, signaling to the hub that a device is present at the port.

USB Bridges

A USB bridge may be used to connect a non-USB peripheral to a USB host. Generally, this requires the bridge to look like a function of that peripheral type (e.g., a printer) to the USB host. At the same time, the bridge must look like, e.g., a host computer parallel port to the attached peripheral.

Figure 3:
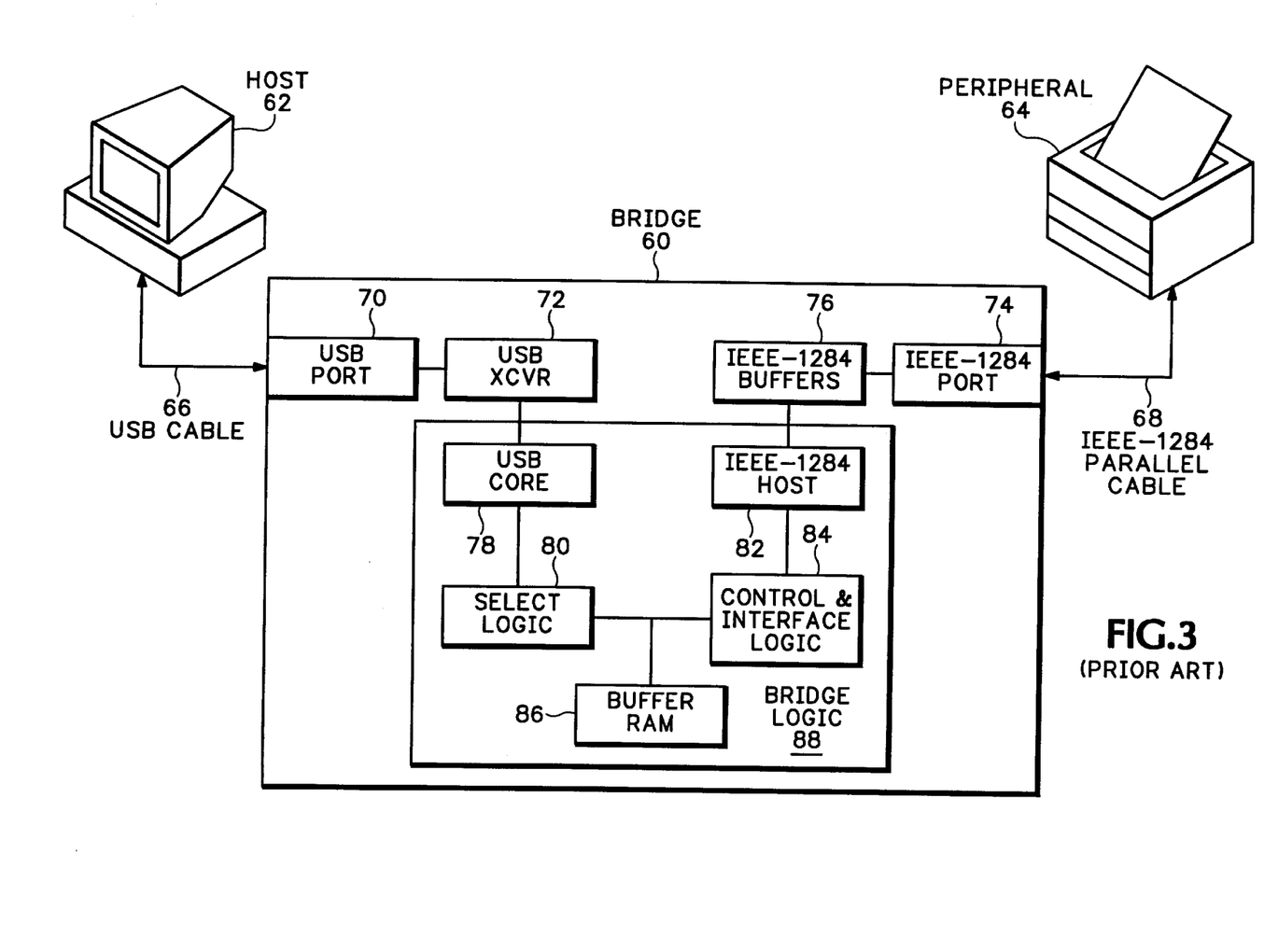
FIG. 3 shows a prior art USB bridge connected between a peripheral and a host.

FIG. 3 illustrates a prior-art bridge 60 connected between a host 62 and a IEEE-1284 printer peripheral 64. A USB cable 66 connects host 62 to USB port 70 on bridge 60. An IEEE-1284 parallel cable 68 connects peripheral 64 to IEEE-1284 parallel port 74 on bridge 60. A USB transceiver 72, similar to the function transceiver shown in FIG. 2, interfaces bridge logic 88 to USB port 70. IEEE-1284 buffers 76 likewise interface bridge logic 88 to IEEE-1284 port 74.

Bridge logic 88 contains both a standard USB device controller core 78 and a standard IEEE-1284 host core 82. These cores are interconnected through select logic 80 and control and interface logic 84. Both 80 and 84 have access to buffer ram 86, used to temporarily store data passing between the host and the peripheral.

As far as host 62 is concerned, bridge 60 is merely the bus interface of a printer. However, bridge 60 cannot act as any specific type of printer on its own as it it merely a relay; it relies on device data supplied from peripheral 64 to gain a USB printer identity. The USB core contains information sufficient to complete the initial steps of USB device enumeration. But the bridge cannot complete enumeration as a printer until it knows specific information about printer 64.

Serial Bus Disconnect

Figure 4:
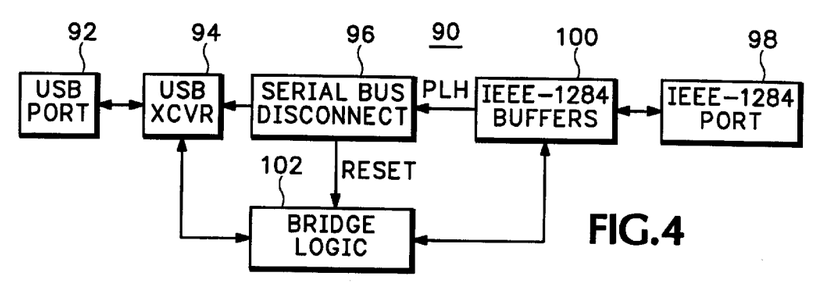
FIG. 4 contains a block diagram of a USB bridge according to the present invention.

The present invention provides for a modified USB bridge 90, as shown generally in block diagram form in FIG. 4. Bridge 90 prevents itself from being enumerated, although it remains physically attached to a USB host, until the bridge is also attached to a ready-to-communicate peripheral. To accomplish this, bridge 90 operates a serial bus disconnect circuit 96. This circuit preferably does not actually provide for either a physical disconnect or a solid-state switched disconnect of data lines D+ and D− from USB transceiver 94. Serial bus disconnect circuit 96 instead manipulates transceiver 94 such that it appears to an attached host that bridge 90 is not present.

Bridge 90 will go undetected by a host as long as a single-ended zero condition persists on data lines D+ and D−. Under the USB specification, a single-ended zero exists when both data lines D+ and D− are low. An upstream transceiver's pull-down resistors (see $R_{D1}$ and $R_{D2}$ of FIG. 2) pull the data lines to a single-ended zero state when no downstream device is attached. When a downstream device is present, a single-ended zero is only expected from a downstream device to signal an end-of-packet (EOP) condition. This single-ended zero lasts for two bit times (160 to 175 nanoseconds for a full-speed device).

An upstream hub will assume a function disconnect has occurred if it detects a single-ended zero (not initiated by the hub) on a USB port for at least 2.5 microseconds. A bridge according to the present invention makes use of this property to hide itself from a host. The bridge provides for a single-ended zero by either driving the D+ line low itself, or creating a condition that allows a hub's pull-down resistor to take the line low. The bridge can remain in this state, powered and connected to the USB, until its peripheral is attached and ready to communicate with the host.

In order to determine whether an IEEE-1284 device is attached to bridge 90 and ready to communicate, bridge 90 could communicate with the peripheral device to determine its state. Such a scheme may work if the bridge is pre-configured to work with a specific device. But because a wide variety of peripheral devices, with widely different capabilities, exist, a reliable peripheral state detection based on such communication would require a generic bridge to have a high degree of sophistication. It would be almost impossible for such a generic device to work with any possible peripheral.

As an alternative, a generic bridge may sense the state of the Peripheral Logic High (PLH) input from the peripheral. The IEEE-1284-1994 specification requires a compliant device to assert (i.e., set to +5 V) PLH when it is ready to communicate. Bridge 90 can sense when this line is deasserted (i.e., 0 V) or floating, and need not inquire further into the state of the peripheral. Whether the peripheral is physically unattached, powered off, initializing, or in a fault state, bridge 90 can use PLH to hide itself from its USB host.

FIG. 4 shows serial bus disconnect 96 receiving the PLH signal directly from IEEE-1284 buffers 100. Alternately, PLH may be sensed directly from IEEE-1284 port 98, or obtained from a register within bridge logic 102. In the latter instance, serial bus disconnect circuit 96 may in fact be integrated within bridge logic 102.

FIG. 4 shows an optional reset connection between serial bus disconnect circuit 96 and bridge logic 102. The reset connection may be used to hold bridge logic 102 in an off, low-power, or sleep state until an IEEE-1284 device is ready for communication.

Alternate Embodiments

Figure 5:
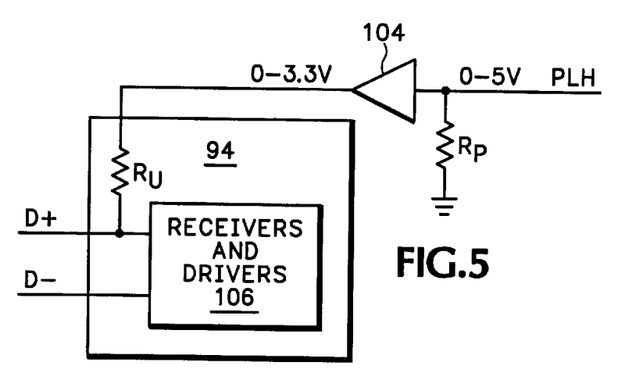
FIGS. 5 and 6 illustrate block diagrams of buffer circuits useful in the present invention.

One possible implementation of a serial bus disconnect circuit is shown in FIG. 5. In this embodiment, buffer 104 is connected between a PLH signal and transceiver 94's pull-up resistor $R_U$. When PLH is high, buffer 104 produces a pull-up voltage that allows $R_U$ to pull D+ to a normal idle state, resulting in the bridge being detected by an attached hub. When PLH is low or floating, the input voltage to buffer 104 is reduced. Buffer 104 responds by reducing the pull-up voltage to resistor $R_U$, which drops the idle voltage on D+ such that it appears to an upstream hub as if the D+ line has become disconnected. Buffer 104 produces a nominal 3.3 V output for a 5 V input, and a nominal 0 V output for a floating or 0 V input (note that a single-ended zero will be sensed on the line if D+ drops below 0.8 V, thus buffer 104 may produce a detectable single-ended zero by taking the pull-up voltage below 0.88 V).

Figure 6:
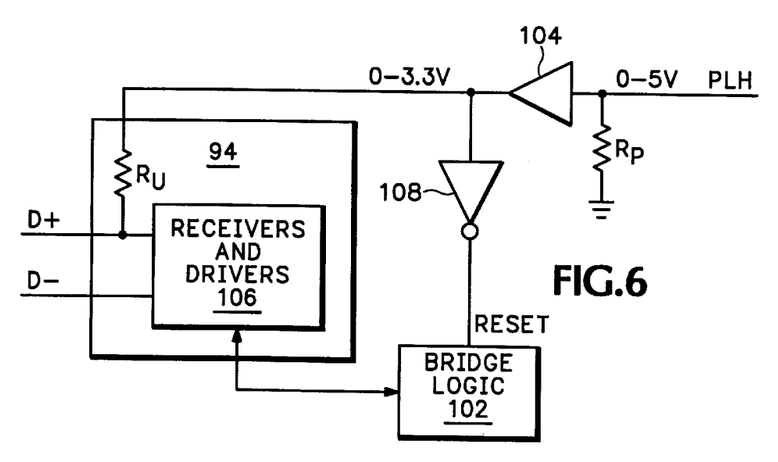

FIG. 6 illustrates a variation on the above embodiment. This variation implements a bridge logic reset. For example, if bridge logic 102 enters a reset state when reset is asserted, inverter 108 may be used to initiate and hold a reset condition on logic 102 whenever PLH is deasserted or floating. As bridge logic 102 typically comprises an integrated circuit, the reset can be used to save power during a serial bus disconnect. Note that other similar means for disabling bridge logic 102, such as disabling its clock input, could also be used for this purpose.

Figure 7:
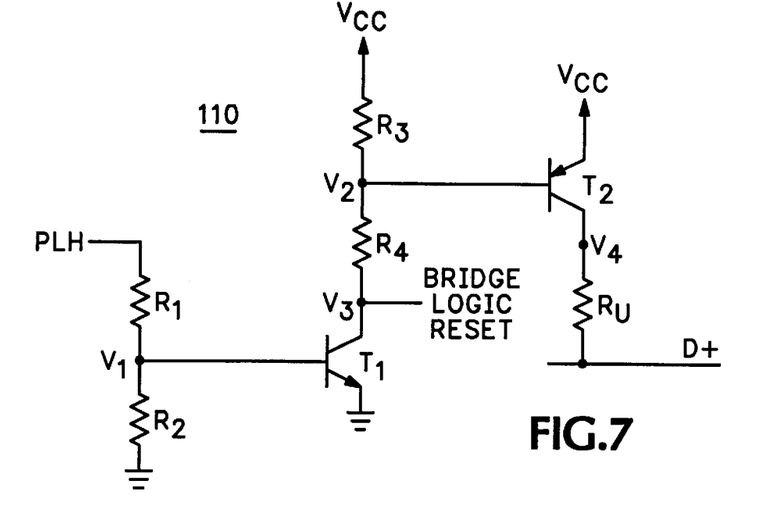
FIG. 7 shows a circuit diagram for a buffer circuit useful in the present invention.

FIG. 7 shows a bipolar transistor implementation 110 of buffer 104 and inverter 108. PLH is attached to the serial combination of bias resistors $R_1$ and $R_2$. Node $V_1$ is attached to the base of npn transistor $T_1$, which has its emitter grounded. The collector of $T_1$ is connected through a second serial combination of bias resistors $R_3$ and $R_4$ to $V_{CC}$ (3.3 V±0.3 V). Node $V_2$ is tied to the base of pnp transistor $T_2$, which has its emitter tied to $V_{CC}$. Finally, $T_2$'s collector is tied through pull-up resistor $R_U$ to data line D+.

Circuit 110 enables normal bridge operation when PLH is asserted (i.e., PLH~5 V). An assertion at PLH drives both $T_1$ and $T_2$ into saturation. $V_3$ will drop to approximately 0.3 V, deasserting bridge logic reset and allowing the bridge logic to operate. $V_4$ will remain about 0.3 V below $V_{CC}$, or about 3 V. With $R_U$~1.5 kΩ, and D+ connected to an upstream hub having a pulldown resistor on D+ $R_{P1}$~15 kΩ, $V_4$=3 V will pull D+ to a voltage of about 2.7 V, comfortably above the 2.0 V threshold required for the upstream hub to recognize a connection.

When PLH is deasserted or floating, circuit 110 simulates a circuit disconnect condition on D+. Either of these conditions turns off $T_1$, which in turn turns off $T_2$. With no current flow through $T_2$, D+ is pulled to ground by the pulldown resistor on the upstream hub, simulating a disconnect condition. Likewise, without current flow through $T_1$, the bridge logic reset connection at $V_3$ will be pulled high.

With the exception of $R_U$, which has a resistance specified by USB, the resistors and transistor current gains for circuit 110 may be chosen to give the output response described above. One possible choice of components is $R_1$=5.76 kΩ, $R_2$=1.69 kΩ, $R_3$=14.7 kΩ, $R_4$=5.11 kΩ, and $\beta \geq 2$ for $T_1$ and $T_2$. Note that the described output response may also be achieved in an analogous circuit using field-effect transistors.

Figure 8:
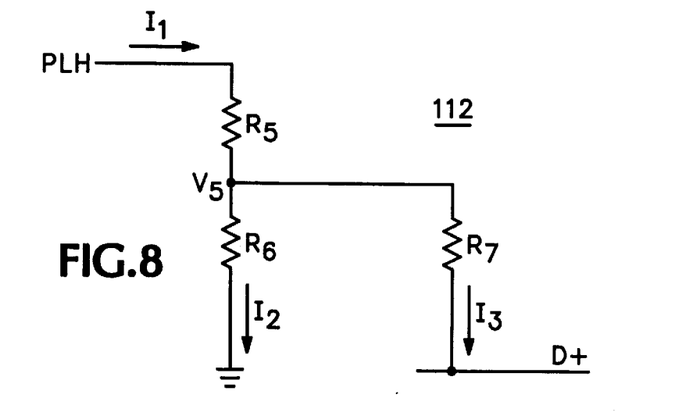
FIG. 8 shows a circuit diagram for a resistive voltage divider circuit useful in the present invention.

FIG. 8 shows an alternate series bus disconnect circuit 112. Circuit 112 uses a resistive voltage divider network to perform the disconnect function. Because pull-up and pull-down resistor values on D+ are known, circuit 112 may be designed to provide an appropriate "connect" response when PLH is high. For instance, assuming PLH=5 V when asserted, $R_7$=1.5 kΩ, and the desired voltages are $V_5$=3.3 V and D+=3.0 V, then $I_3$=0.2 mA. The appropriate relationship between $R_5$ and $R_6$ to create this condition, in units of kΩ, is $$R_6 = \frac{3.3 R_5}{1.7 - 0.2 R_5}.$$

One possible set of resistors to satisfy this condition is $R_5$=1 kΩ and $R_6$=2.2 kΩ. With these values, an idle D+ will pull a current $I_1$=1.7 mA from PLH. When PLH is deasserted, circuit 112 will pull D+ low. If PLH is left floating, D+ will also be pulled low.

One concern with circuit 112 is that current demand from PLH will change as signaling occurs on D+. When D+ is driven low by a transceiver, $V_5$ will drop to about 2.4 volts and the current drawn from PLH will rise to about 2.6 mA (from 1.7 mA when D+ is in an idle or driven high state). If it is preferred that these currents and/or current fluctuations be isolated from the parallel bus, the PLH input to circuit 112 should be buffered.

Figure 9:
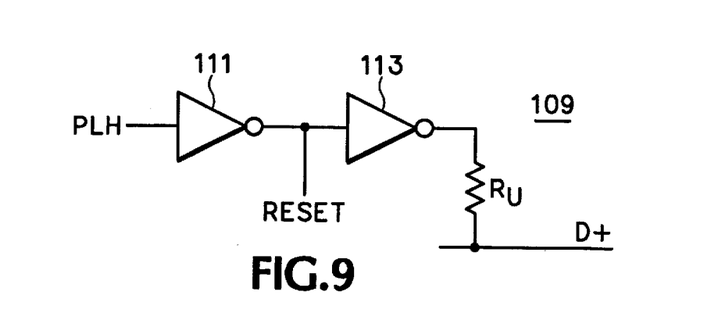
FIG. 9 shows a circuit diagram for an inverter-implemented buffer circuit useful in the present invention.

A circuit that buffers the PLH input with inverters is shown in FIG. 9. Serial bus disconnect circuit 109 provides a PLH buffer, a bridge logic reset output, and a pull-up voltage output to pull-up resistor $R_U$ using two inverters 111 and 113. These two inverters may, e.g., be added to bridge circuitry by incorporating a standard logic device, such as a Fairchild Semiconductor 74AC04 Hex Inverter chip. It is preferred that the inverters be powered from a 3.3 V source; if this renders inverter 111 intolerant to a 5 V PLH input, a resistive divider network such as the $R_{10}$, $R_{11}$ network shown in FIG. 10 can be used at the input to inverter 111.

Figure 10:
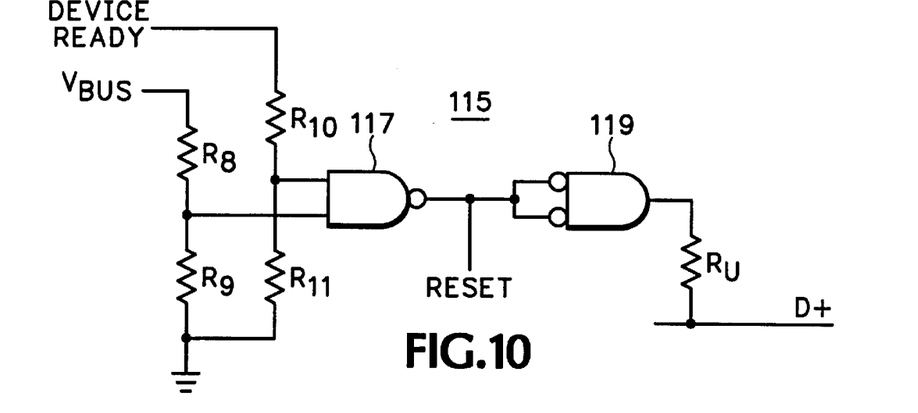
FIG. 10 illustrates a circuit diagram for a NAND-implemented buffer circuit useful with a self-powered bridge and the present invention.

FIG. 10 shows the layout for a serial bus disconnect circuit 115 that is configured for use with a self-powered bridge. Circuit 115 uses two NAND logic gates, 117 and 119, to control the pull-up voltage at $R_U$ and a reset connection. First NAND gate 117 receives inputs both from the USB $V_{BUS}$, and from a device ready signal on the peripheral (this could be PLH, or a power-on signal). Assuming 5 V-asserted signals for both of these inputs, the resistive voltage dividers $R_8$, $R_9$ and $R_{10}$, $R_{11}$ step these signal voltages down to an appropriate range for NAND gate 117, and insure a low input to gate 117 if an input is left floating.

If both inputs to gate 117 are asserted, reset will go low and the output of gate 119 will go high, enabling normal bridge and bus operation. If the $V_{BUS}$ source (an upstream hub) is unpowered, bridge logic will be held in reset, and D+ will be held low. If the $V_{BUS}$ source is powered but the peripheral device is not ready, bridge logic will remain in reset and D+ will remain low.

Serial bus disconnect circuit 115 may be implemented, e.g., using a Fairchild Semiconductor 74AC00 Quad 2-input NAND gate chip and resistor values of $R_8=R_{10}=100$ k$\Omega$ and $R_9=R_{11}=240$ k$\Omega$.

Figure 11:
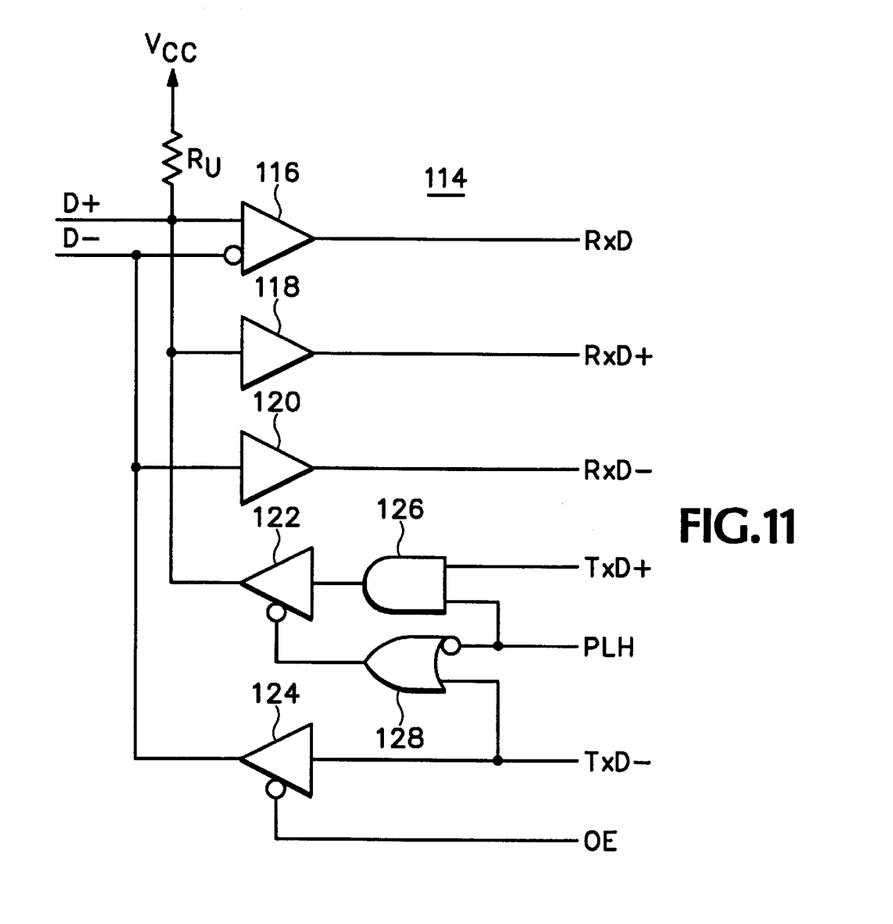
FIG. 11 depicts a block diagram of USB transceiver circuitry useful in the present invention.

FIG. 11 illustrates an embodiment of a serial bus disconnect circuit that does not manipulate the pull-up resistance or pull-up voltage. Circuit 114 instead utilizes the transceiver's D+ line driver 122 to drive D+ low when PLH is not asserted.

Line drivers 122 and 124 are normally placed in a high-impedance state (by deasserting OE) whenever a bridge is not transmitting. This state floats D+ and D−, allowing the upstream transceiver to drive the line, or otherwise allowing $R_U$ to pull D+ high to signify an idle state. A disconnect can be simulated by enabling D+ line driver 122 during an idle period and driving D+ low.

Circuit 114 contains an AND gate 126 located at the input of D+ line driver 122. Inputs to this AND gate are the transmit data line TxD+, and PLH. When PLH is asserted by an attached peripheral, AND gate 126 faithfully replicates the TxD+ signal to D+ line driver 122. But when PLH is deasserted (a pull-down resistor, not shown, may be used on the PLH line to deassert the line if left floating by a peripheral), AND gate 126 supplies a low signal to D+ line driver 122. At the same time, the low PLH value is inverted by OR gate 128, output-enabling D+ line driver 122. Consequently, D+ line driver 122 drives line D+ low, simulating a disconnected state.

Because circuit 114 actually drives the D+ line to simulate a disconnect, additional logic (not shown) may be used to prevent D+ from being driven in opposite directions simultaneously. USB convention specifies that it is acceptable for drivers at both ends of a connection to drive a line to the same value. But in some situations, circuit 114 may drive the D+ line in a direction opposite of the upstream hub. For example, if PLH goes low while an upstream bridge is driving D+ high, an undesirable condition may occur. In order to prevent this, the PLH signal supplied to gates 126 and 128 can be held high by bridge logic until an idle condition occurs on the data lines. Once a disconnect is recognized, however, by an upstream hub, the hub should not drive the line and the low PLH drive condition can remain until a peripheral reasserts PLH.

An active-low driving implementation does not meet the USB specification because it drives the line without permission. Such an embodiment is therefore much less preferred than other embodiments that merely allow the upstream hub to sense a low quiescent condition on D+.

Bus-Bridge Configurations

The present invention has application particularly where a bridge must be designed to operate with a variety of possible peripherals. For example, a bridge according to the present invention can be substituted for prior-art bridge 60 in FIG. 3. In this configuration, a bridge is powered from USB cable 66 whenever cable 66 is powered, regardless of the power state of peripheral 64. A bridge according to the present invention prevents host 62 from "seeing" the bridge unless it can also "see" the peripheral.

Figure 12:
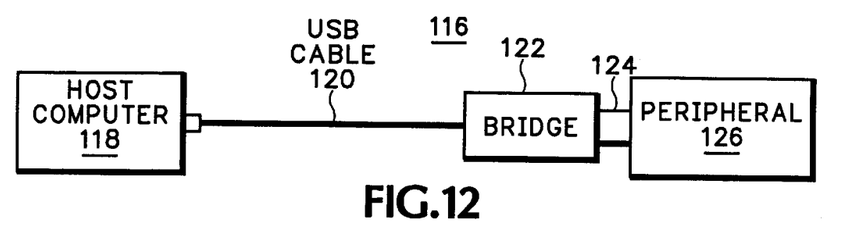
FIGS. 12, 13, 14, and 15 illustrate various USB configurations that employ the present invention.
Figure 14:
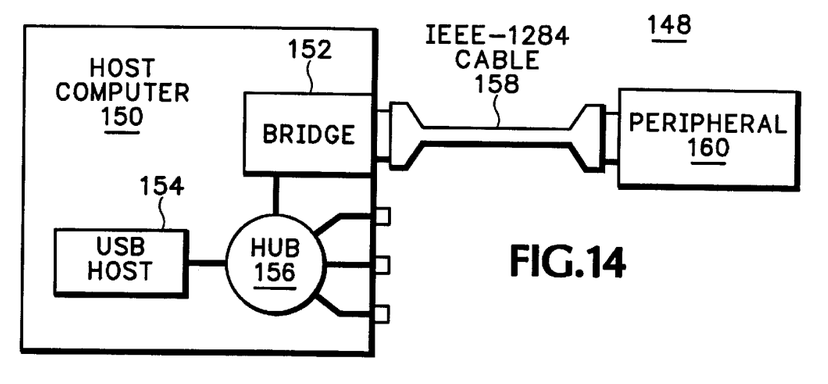

It is not necessary, and in most cases not preferable, to attach a bridge according to the invention midway between a host and a peripheral. In FIG. 12, bus-powered bridge 122 attaches directly to parallel port 124 of peripheral 126, obviating a bulky and somewhat expensive parallel cable. In FIG. 14, host-powered bridge 152 is integrated into host computer 150. In both cases, these bridges power up when a host powers up, but can avoid detection by the host via a serial bus disconnect.

Figure 13:
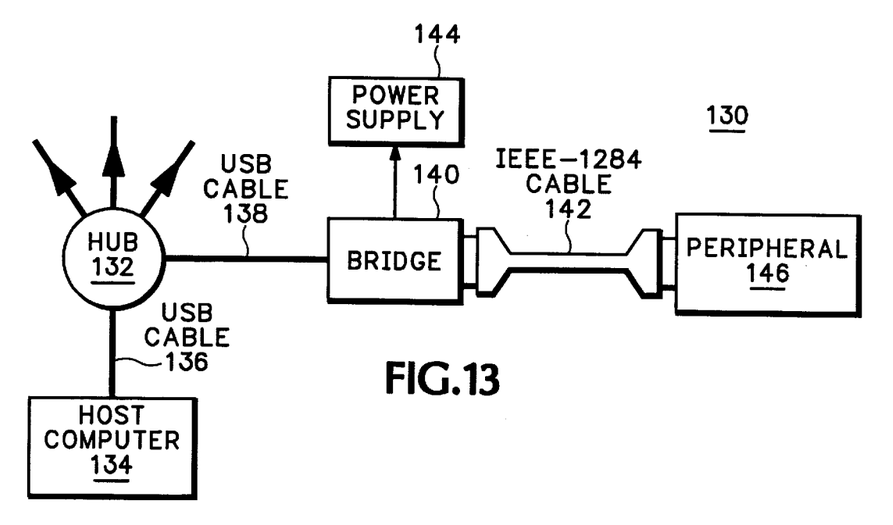

FIG. 13 illustrates a further application of the invention, i.e., the self-powered bridge. Bridge 140 is powered from neither USB cable 138 nor peripheral 146. Instead it is "self-powered", e.g., bridge 140 receives power from power supply 144. Such a bridge can integrate a serial bus disconnect according to the invention with logic that senses whether upstream devices, such as hub 132, are powered. If hub 132 is not powered, bridge 140 could alternately choose not to simulate a disconnect condition on its end of USB cable 138, e.g., as shown in FIG. 10.

Figure 15:
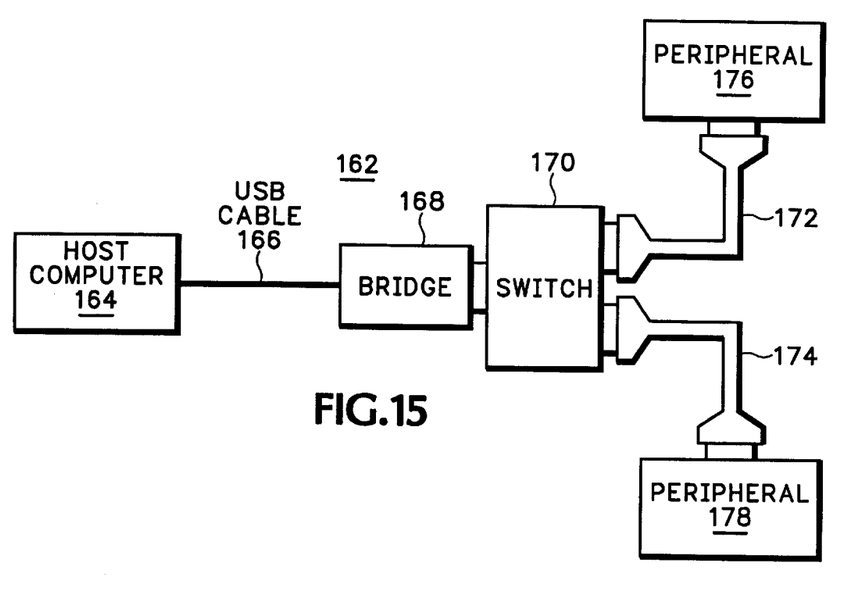

FIG. 15 illustrates a configuration 162 wherein a single bridge 168 may be attached to two switched peripherals 176 and 178. When switch 170 is poled from one peripheral to another, the momentary disconnect of PLH should be sufficient to allow bridge 168 to simulate a disconnect to host 164. As the new peripheral is connected, bridge 168 re-appears and is re-enumerated. An advantage of this operation is that operation of the switch causes the appropriate drivers for the new peripheral to be loaded on the host, without the bridge having to explicitly recognize that a different device is now connected through it.

Other modifications to the disclosed embodiments will be obvious to those of ordinary skill in the art upon reading this disclosure, and are intended to fall within the scope of the invention as claimed.

What is claimed is:

1. A Universal Serial Bus to parallel bus bridge comprising:
   a D+ and a D− serial bus connection;
   a parallel bus connection; and a serial bus disconnect circuit that senses the existence of a not-ready condition at said parallel bus connection, and responds to said not-ready condition by providing for a single-ended zero state on said D+ and D− serial bus connections.

2. A Universal Serial Bus to parallel bus bridge comprising:

a D+ and a D− serial bus connection;

a peripheral-device-ready signal parallel bus connection; and a serial bus disconnect circuit connected to said peripheral-device-ready signal parallel bus connection, said serial bus disconnect circuit responding to a floating condition or a not-ready signal appearing at said peripheral-device-ready signal parallel bus connection by providing for a single-ended zero state on said D+ and D− serial bus connections.

3. The bridge of claim 2, further comprising a D+ data transmit driver connected to said D+ serial bus connection and a D− data transmit driver connected to said D− serial bus connection, wherein said serial bus disconnect circuit provides for a single-ended zero state by driving said D+ data transmit driver to a low state while said D− data transmit driver is either in a high-impedance state or a low state.

4. The bridge of claim 2, wherein said serial bus disconnect circuit comprises a buffer having an input tied to said peripheral-device-ready signal parallel bus connection, said bridge further comprising a pull-up resistance $R_P$, having an effective value of 1.5 kΩ±5%, connected between said D+ serial bus connection and the output of said buffer, wherein said serial bus disconnect circuit provides for a single-ended zero state by driving the output of said buffer to either a high-impedance state or a low state.

5. The bridge of claim 2, wherein said bridge is powered from its serial bus connection.

6. The bridge of claim 2, wherein said bridge is self-powered.

7. The bridge of claim 2, wherein said bridge is configured for attachment between the external parallel port of a peripheral and an external Universal Serial Bus port of a host.

8. The bridge of claim 2, wherein said bridge is integrated into a host system.

9. The bridge of claim 2, wherein said bridge further comprises a bridging logic circuit having a reset, wherein said serial bus disconnect circuit is tied to said reset so as to hold said bridging logic circuit in a reset state while providing for a single-ended zero state on said D+ and D− serial bus connections.

10. The bridge of claim 9, wherein when said bridging logic is in said reset state, said bridging logic provides for a single-ended zero state on said D+ and D− serial bus connections.

11. A Universal Serial Bus to IEEE-1284-1994 compliant parallel bus bridge comprising:

a Universal Serial Bus port having a D+ connection, a D− connection, a $V_{bus}$ connection, and a serial bus ground connection;

an IEEE-1284-1994 compliant parallel port having a Peripheral Logic High signal connection; and a serial bus disconnect circuit tied to said Peripheral Logic High signal connection, said serial bus disconnect circuit responding to a floating condition or a deassert signal appearing at said Peripheral Logic High signal connection by providing for a single-ended zero state on said D+ and D− connections.

12. The bridge of claim 11, further comprising a D+ data transmit driver connected to said D+ connection and a D− data transmit driver connected to said D− connection, wherein said serial bus disconnect circuit provides for a single-ended zero state by driving said D+ data transmit driver to a low state while said D− data transmit driver is either in a high-impedance state or a low state.

13. The bridge of claim 11, wherein said serial bus disconnect circuit comprises a buffer having an input connected to said Peripheral Logic High signal connection and an output connected through a resistance of 1.5 kΩ±5% to said D+ connection, wherein when said bridge is powered, a floating condition or a low condition at said Peripheral Logic High signal connection produces either a high impedance or a low state at said buffer output.

14. A method of operating a powered bridge between a Universal Serial Bus host and an IEEE-1284-1994 peripheral, said method comprising the steps of:

indicating a device connect condition to said Universal Serial Bus host when said peripheral asserts its IEEE-1284-1994 Peripheral Logic High signal; and indicating a device disconnect condition to said Universal Serial Bus host when said peripheral deasserts or floats its IEEE-1284-1994 Peripheral Logic High signal, or when said peripheral is physically disconnected from said bridge.

15. The method of claim 14, wherein said indicating a device connect condition step comprises connecting a 3.3 V ±0.3 V supply to the D+ Universal Serial Bus line through a 1.5 kΩ±5% resistance when said peripheral's Peripheral Logic High signal is asserted.

16. The method of claim 14, wherein said indicating a device connect condition step comprises connecting said peripheral's Peripheral Logic High signal to both the D+ Universal Serial bus line and to the Universal Serial Bus ground through a resistive voltage divider circuit that approximates a 1.5 kΩ impedance tied to a 3.3 V supply when said Peripheral Logic High signal is asserted.

17. The method of claim 14, wherein said indicating a device disconnect condition step comprises increasing the resistance between a 3.3 V ±0.3 V supply and the D+ Universal Serial Bus line to a value significantly greater than 15 kΩ when said Peripheral Logic High signal is deasserted or floating.

18. The method of claim 14, wherein said indicating a device connect condition and indicating a device disconnect condition steps comprise buffering said peripheral's Peripheral Logic High signal with a buffer producing a 3.3 V ±0.3 V output for a 5 V input signal, and referencing a pull-up resistor to said buffer output, where said pull-up resistor is connected to the D+ bridge connection to the Universal Serial Bus.

19. The method of claim 14, wherein said bridge comprises a bridging logic circuit, further comprising the step of holding said bridging logic circuit in a reset state when said peripheral's Peripheral Logic High signal is either deasserted or floating.

\* \* \* \* \*

UNITED STATES PATENT AND TRADEMARK OFFICE
CERTIFICATE OF CORRECTION

PATENT NO. : 6,279,060 B1
DATED : August 21, 2001
INVENTOR(S) : Luke et al.

It is certified that error appears in the above-identified patent and that said Letters Patent is hereby corrected as shown below:

Column 4,
Line 46, "as it it merely" should read -- as it merely --.

Column 10,
Line 39, "Serial bus" should read -- Serial Bus --.

Signed and Sealed this

Thirtieth Day of July, 2002

Attest:

Attesting Officer

JAMES E. ROGAN
Director of the United States Patent and Trademark Office